(12) United States Patent
Miyashita et al.

(10) Patent No.: US 11,915,116 B2
(45) Date of Patent: Feb. 27, 2024

(54) ARITHMETIC APPARATUS FOR A NEURAL NETWORK

(71) Applicant: KIOXIA CORPORATION, Tokyo (JP)

(72) Inventors: Daisuke Miyashita, Kawasaki Kanagawa (JP); Shouhei Kousai, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 2018 days.

(21) Appl. No.: 15/628,159

(22) Filed: Jun. 20, 2017

(65) Prior Publication Data
US 2017/0364791 A1    Dec. 21, 2017

(30) Foreign Application Priority Data

Jun. 20, 2016 (JP) .................................. 2016-121918

(51) Int. Cl.
*G06F 7/575* (2006.01)
*G06F 7/544* (2006.01)
*G06N 3/04* (2023.01)
*G06N 3/08* (2023.01)
(Continued)

(52) U.S. Cl.
CPC ................ *G06N 3/04* (2013.01); *G06F 7/00* (2013.01); *G06F 7/48* (2013.01); *G06F 7/5443* (2013.01);
(Continued)

(58) Field of Classification Search
CPC . G06F 7/5443; G06F 7/00; G06F 7/48; G06F 7/523; G06F 7/575; G06N 3/04; G06N 3/063; G06N 3/08; G06G 7/12; G06G 7/16; G06J 1/00; G06J 1/0005; G04F 10/00; G04F 10/005; H03H 7/30; H03H 11/26; H03H 17/0009
See application file for complete search history.

(56) References Cited

U.S. PATENT DOCUMENTS 9,361,577 B2    6/2016   Miyashita
9,467,129 B2   10/2016   Kousai
(Continued)

OTHER PUBLICATIONS

D. Miyashita et al., "An LDPC Decoder With Time-Domain Analog and Digital Mixed-Signal Processing," in IEEE Journal of Solid-State Circuits, vol. 49, No. 1, pp. 73-83, Jan. 2014, doi: 10.1109/JSSC.2013.2284363. (Year: 2013).*
(Continued)

*Primary Examiner* — Jyoti Mehta
*Assistant Examiner* — Huy Duong
(74) *Attorney, Agent, or Firm* — Kim & Stewart LLP (57) ABSTRACT

An arithmetic apparatus used for a neural network includes a plurality of digital-time conversion circuits connected in series and a time-digital conversion circuit connected to a last digital-time conversion circuit in the series. Each of the digital-time conversion circuits is configured to delay a first input time signal by a variable amount, delay a second input time signal by a fixed amount, and output the delayed first and second input time signals respectively as either first and second output time signals or second and first output time signals, in accordance with the input data. The time-digital conversion circuit is configured to generate a digital output signal by comparing first and second output time signals from the last digital-time conversion circuit.

18 Claims, 12 Drawing Sheets

(51) Int. Cl.
*G06F 7/48* (2006.01)
*G06F 7/00* (2006.01)
*G06N 3/063* (2023.01)
*G06G 7/16* (2006.01)

(52) U.S. Cl.
CPC .............. *G06F 7/575* (2013.01); *G06N 3/063* (2013.01); *G06N 3/08* (2013.01); *G06F 2207/4824* (2013.01); *G06G 7/16* (2013.01)

(56) References Cited

U.S. PATENT DOCUMENTS

| | | | |
|---|---|---|---|
| 2014/0055296 A1* | 2/2014 | Miyashita | G04F 10/005 341/166 |
| 2015/0074028 A1* | 3/2015 | Miyashita | G06N 3/065 706/27 |
| 2019/0294957 A1* | 9/2019 | Tachibana | G06N 3/063 |

OTHER PUBLICATIONS

D. Miyashita, S. Kousai, T. Suzuki and J. Deguchi, "Time-domain neural network: A 48.5 TSOp/s/W neuromorphic chip optimized for deep learning and CMOS technology," 2016 IEEE Asian Solid-State Circuits Conference (A-SSCC), Toyama, Japan, 2016, pp. 25-28, doi: 10.1109/ASSCC.2016.7844126. (Year: 2016).*

D. Miyashita, S. Kousai, T. Suzuki and J. Deguchi, "A Neuromorphic Chip Optimized for Deep Learning and CMOS Technology With Time-Domain Analog and Digital Mixed-Signal Processing," in IEEE Journal of Solid-State Circuits, vol. 52, No. 10, pp. 2679-2689, Oct. 2017, doi: 10.1109/JSSC.2017.2712626. (Year: 2017).*

Courbariaux, Matthieu, et al. "Binarized Neural Networks: Training Deep Neural Networks with Weights and Activations Constrained to +1 or -1." arXiv.Org, Mar. 17, 2016, arxiv.org/abs/1602.02830. (Year: 2016).*

* cited by examiner

ARITHMETIC APPARATUS FOR A NEURAL NETWORK

CROSS-REFERENCE TO RELATED APPLICATION

This application is based upon and claims the benefit of priority from Japanese Patent Application No. 2016-121918, filed Jun. 20, 2016, the entire contents of which are incorporated herein by reference.

Field

Embodiments described herein relate generally to an arithmetic apparatus used for a neural network and a neural network having the arithmetic apparatus.

Background

Recently, research related to Deep Learning is extensive. To implement Deep Learning, a multilayer neural network that carries out high-level analysis is built. Also, it is considered to perform a process of Deep Learning using hardware. Research into reducing the number of bits of data for a high speed calculation and low power consumption has been extensively performed, and achievements relating thereto have begun to be realized. However, since a device such as a CPU, a GPU, and a DSP widely used for performing the process of Deep Learning is optimized for single precision floating point arithmetic of 32 bits, the advantage of high speed calculation and low power consumption obtained by reducing the number of bits of data is limited in such a device.

DETAILED DESCRIPTION

An embodiment provides an arithmetic apparatus capable of performing a process of Deep Learning at a high speed and low power consumption.

According to an embodiment, an arithmetic apparatus used for a neural network includes a plurality of digital-time conversion circuits connected in series and a time-digital conversion circuit connected to a last digital-time conversion circuit in the series. Each of the digital-time conversion circuits is configured to delay a first input time signal by a variable amount, delay a second input time signal by a fixed amount, and output the delayed first and second input time signals respectively as either first and second output time signals or second and first output time signals, in accordance with the input data. The time-digital conversion circuit is configured to generate a digital output signal by comparing first and second output time signals from the last digital-time conversion circuit.

Hereinafter, embodiments will be specifically described with reference to the diagrams. The exemplary embodiment is not limited to the embodiments.

First Embodiment

Figure 1:
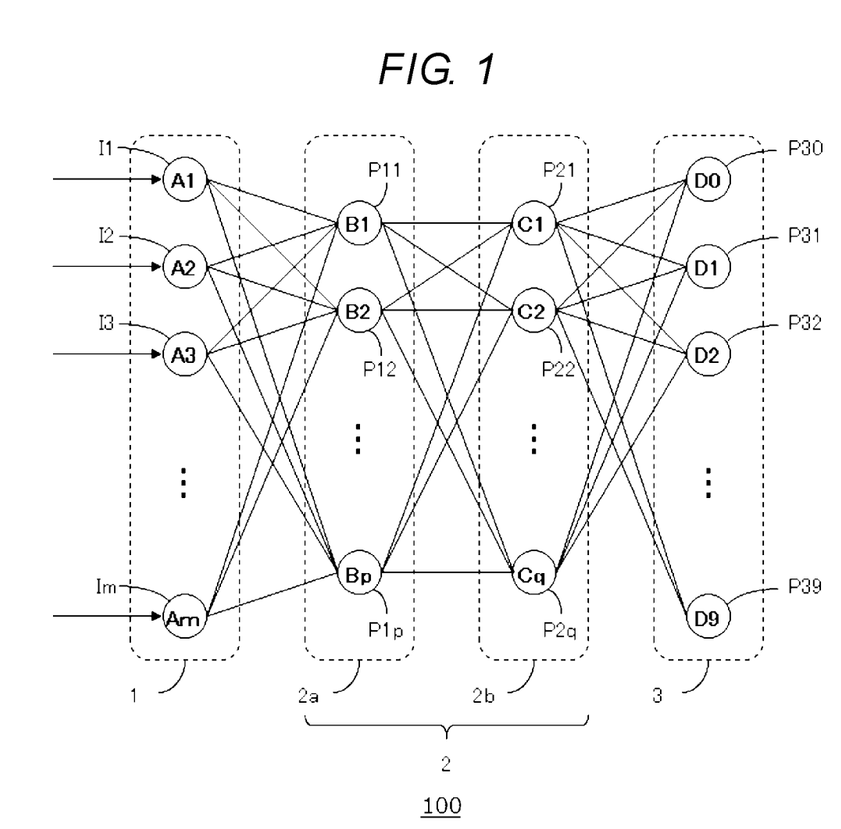
FIG. 1 is a block diagram of a neural network according to an embodiment.

In a first embodiment, it is assumed that an arithmetic apparatus is used in a neural network. FIG. 1 is a block diagram of the neural network. A neural network 100 includes an input layer 1, one or more hidden layers 2, and an output layer 3. The hidden layers 2 and the output layer 3 are collectively referred to as an arithmetic layer. FIG. 1 illustrates an example of the neural network including two-layered hidden layers 2a and 2b. The hidden layer 2a is a first-stage hidden layer. In addition, the hidden layer 2b is a hidden layer subsequent to the hidden layer 2a of the previous stage or a hidden layer of a final stage.

The input layer 1 includes m input units I1 to Im corresponding to m input data A1 to Am, respectively. k-th input data Ak is input to the input unit Ik.

The hidden layer 2a includes p (p is an arbitrary integer) arithmetic apparatuses P11 to P1p. The operation of each of arithmetic apparatuses P11 to P1p is the same. Hereinafter, the k-th arithmetic apparatus P1k will be described. The m input data A1 to Am are input from the input layer 1 to the arithmetic apparatus P1k. Then, the arithmetic apparatus P1k performs a predetermined arithmetic operation with respect to the input data A1 to Am and weights Fk1 to Fkm respectively corresponding thereto, and generates a digital value Bk. The digital value Bk becomes input data of the hidden layer 2b of a next stage. The digital value Bk may be one bit, or may be a plurality of bits.

The hidden layer 2b includes q (q is an arbitrary integer) arithmetic apparatuses P21 to P2q. The operation of each of arithmetic apparatuses P21 to P2q is the same. Hereinafter, the k-th arithmetic apparatus P2k will be described. P digital values B1 to Bp are input from the hidden layer 2a to the arithmetic apparatus P2k. Then, the arithmetic apparatus P2k performs a predetermined arithmetic operation with respect to the digital values B1 to Bp and weights Gk1 to Gkp respectively corresponding thereto, and generates a digital value Ck. The digital value Ck becomes input data of the output layer 3. The digital value Ck may be one bit, or may be a plurality of bits.

For example, the output layer 3 includes ten arithmetic apparatuses P30 to P39. The arithmetic apparatuses as much as the number of recognition results are provided in the output layer 3. An operation of each of the arithmetic apparatuses P30 to P39 is the same. Hereinafter, the k-th arithmetic apparatus P3k will be described. q digital values C1 to Cq are input from the hidden layer 2b to the arithmetic apparatus P3k. Then, the arithmetic apparatus P3k performs a predetermined arithmetic operation with respect to the digital values C1 to Cq and weights Hk1 to Hkq, respectively, corresponding thereto, and generates a digital value Dk. For example, k which provides the maximum Dk becomes the recognition result.

The weights Fk1 to Fkm, Gk1 to Gkp, and Hk1 to Hkq are important parameters in the neural network 100, and the weights are appropriately set such that it is possible to accurately analyze the input data.

In FIG. 1, the neural network 100 including the two-layered hidden layers is exemplified. However, the hidden layer may be only one layer, or one or more hidden layers 2 may be provided between the hidden layers 2a and 2b. Typically, as the number of hidden layers increases, accuracy of recognition is improved further.

Figure 2:
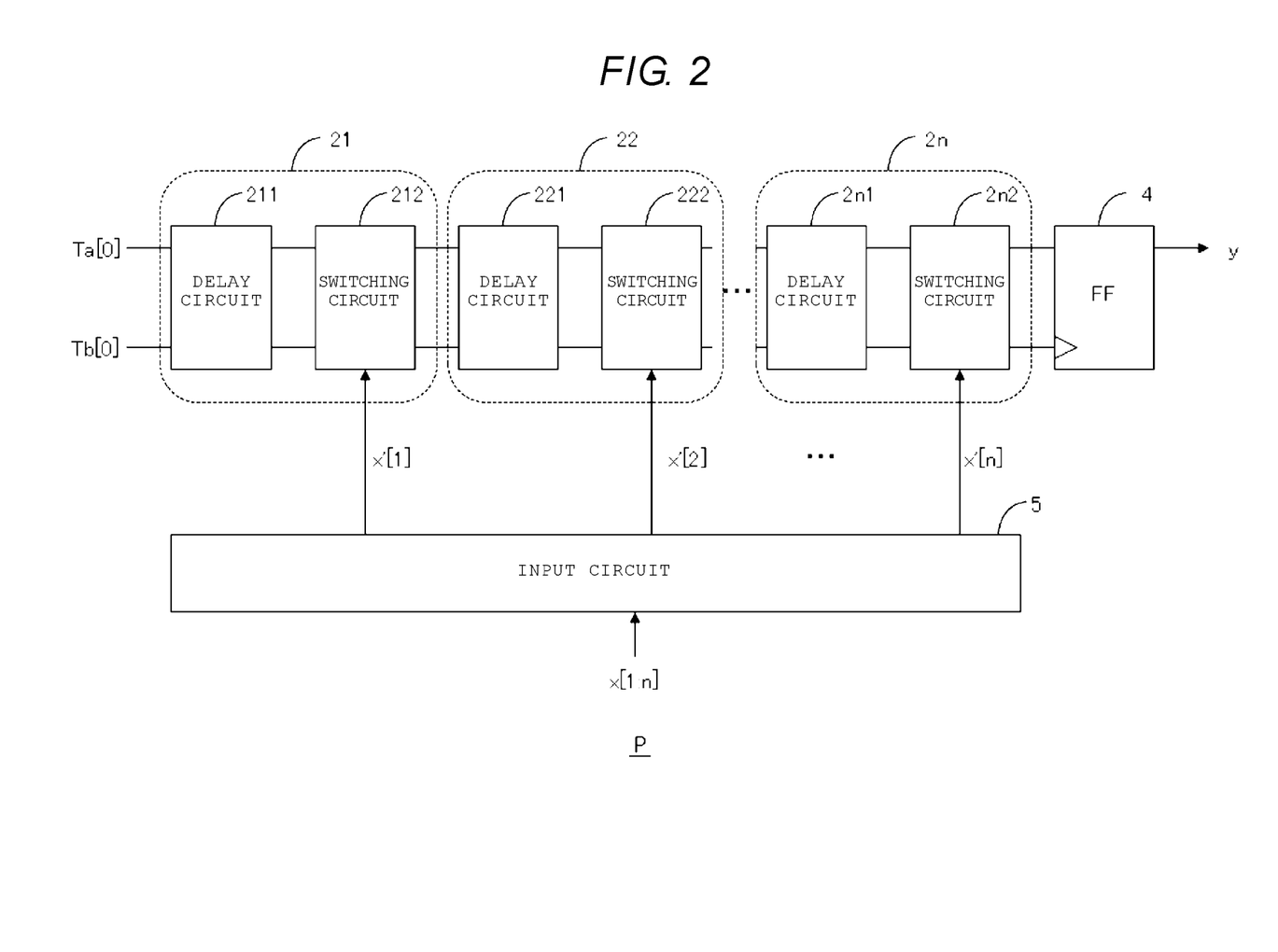
FIG. 2 is a block diagram of an arithmetic apparatus in the neural network.

Subsequently, an operation of each arithmetic apparatus P will be described. In the neural network, each arithmetic apparatus P in the hidden layer 2 and the output layer 3 performs substantially the same arithmetic operation. FIG. 2 is a block diagram of the arithmetic apparatus P. The arithmetic apparatus P includes n basic units 21 to 2n that are connected in a cascade manner and a flip-flop circuit 4 as a time-digital conversion circuit. The arithmetic apparatus P of the present embodiment performs an arithmetic operation indicated in the following Equation (1).

$$y = \sigma(\Sigma_{i=1}^{n} w_i x_i) \quad (1)$$

$\Sigma$ means total sum of i=1 to n. wi means a weight, and xi means input data. Input data x (x [1] to x [n]) of one bit are input from the input circuit 5 to the basic units 21 to 2n, respectively. The arithmetic apparatus P computes $\Sigma w_i x_i$ by n basic units, and performs an arithmetic operation of $y=\sigma$ ( ) by the flip-flop circuit 4.

Figure 3:
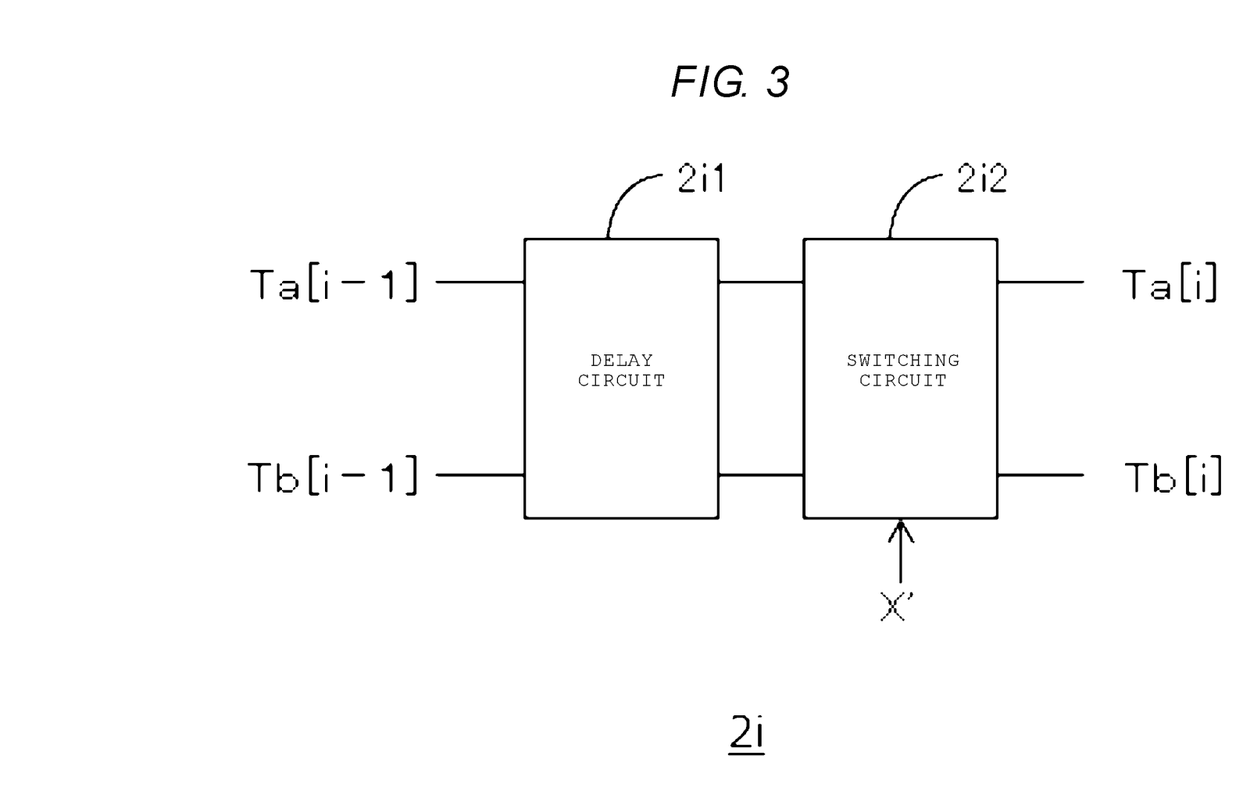
FIG. 3 is a block diagram of a basic unit of the arithmetic apparatus.

Each of the basic units 21 to 2n is a digital-time conversion circuit, and configurations thereof are the same. Hereinafter, an i-th (i=1 to n) basic unit 2i will be described. FIG. 3 is a block diagram of the basic unit 2i. Input data xi is input to the basic unit 2i, and a predetermined weight wi is set to the basic unit 2i, in particular, a delay circuit 2i1 thereof. In addition, first and second input time signals Ta [i−1] and Tb [i−1] are input to the basic unit 2i, and the basic unit 2i generates first and second output time signals Ta [i] and Tb [i]. The first and second input time signals Ta [i−1] and Tb [i−1] are the first and second output time signals in a basic unit 2i−1 of a previous stage.

The first and second input time signals Ta [0] and Tb [0] that are reference time signals are input to the basic unit 21. Reference time signals Ta [0] and Tb [0] are signals of which voltage value transitions at a certain reference time.

The basic unit 2i includes the delay circuit 2i1 and a switching circuit 2i2. The first and second input time signals Ta [i−1] and Tb [i−1] are input to the delay circuit 2i1. The delay circuit 2i1 delays any one or both of the first and second input time signals Ta [i−1] and Tb [i−1] so as to change time difference of both as much as a time in accordance with the weight wi. For simple description, here, it is assumed that a first delay time signal of Ta [i−1]+wi is generated by delaying only the first input time signal Ta [i−1].

Figure 4:
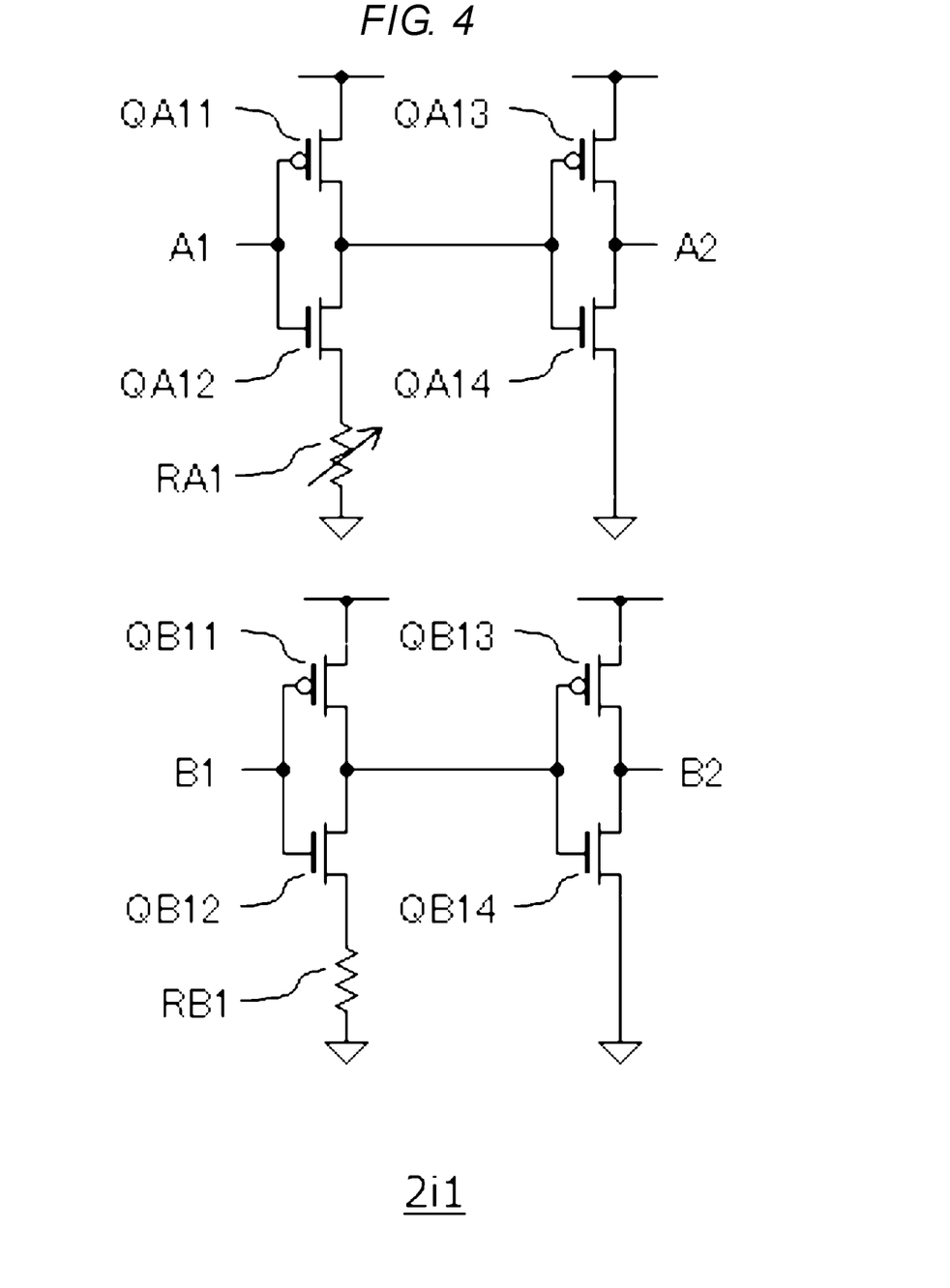
FIG. 4 is a circuit diagram of a delay circuit in the basic unit.

FIG. 4 is a circuit diagram of the delay circuit 2i1. The delay circuit 2i1 includes a first signal line to which a signal A1 is input and outputs a signal A2, and a second signal line to which a signal B1 is input and outputs a signal B2. Also, and a delay element including two inverters is provided on each signal line. The first signal line includes pMOS transistors QA11 and QA13, and nMOS transistors QA12 and QA14. In addition, a variable resistance element RA1 is provided between a source terminal and a ground terminal of the nMOS transistor QA12. A resistance value of the variable resistance element RA1 is set to delay a period of time corresponding to the weight wi. The second signal line includes pMOS transistors QB11 and QB13 and nMOS transistors QB12 and QB14. In addition, a resistance element RB1 is provided between a source terminal and a ground terminal of the nMOS transistor QB12. A resistance element maybe provided between a source terminal and a power source terminal or a ground terminal of each transistor.

A time signal output from the delay circuit 2i1 is input to the switching circuit 2i2, and the switching circuit 2i2 performs switching in an output signal line based on the input data xi. That is, the switching circuit 2i2 outputs the first delay time signal Ta [i−1]+wi as a first output time signal Ta [i], and outputs a second input time signal Tb [i−1] as a second output time signal Tb [i]. Alternatively, the switching circuit 2i2 outputs a first delay time signal Ta [i−1]+wi as the second output time signal Tb [i], and outputs the second input time signal Tb [i−1] as the first output time signal Ta [i]. The second input time signal Tb [i−1] is also a second delay time signal.

Figure 5:
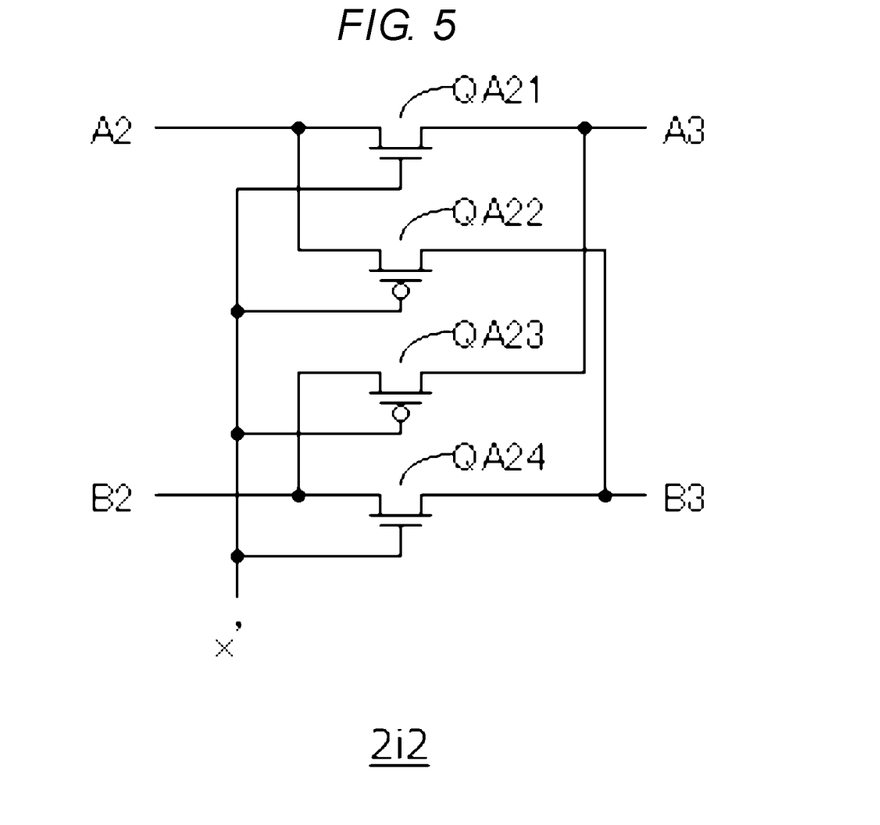
FIG. 5 is a circuit diagram of a switching circuit in the basic unit.

FIG. 5 is a circuit diagram of the switching circuit 2i2. The switching circuit 2i2 includes a switching element including the MOS transistor. The switching circuit 2i2 includes a first input signal line to which the signal A2 is input, a second input signal line to which the signal B2 is input, a first output signal line that outputs a signal A3, a second output signal line that outputs a signal B3, nMOS transistors QA21 and QA24, and pMOS transistors QA22 and QA23. The signal A2 is the first delay time signal Ta [i−1]+wi, and the signal B2 is the second input time signal Tb [i−1]. The signal A3 is the first output time signal Ta [i], and the signal B3 is the second output time signal Tb [i].

A source-drain terminal of an nMOS transistor is connected between the first input signal line and the first output signal line. A source-drain terminal of a pMOS transistor QA21 is connected between the first input signal line and the second output signal line. A source-drain terminal of a pMOS transistor QA23 is connected between the second input signal line and the first output signal line. A source-drain terminal of an nMOS transistor QA24 is connected between the second input signal line and the first output signal line. The input data of one bit is input to a gate terminal of each MOS transistor.

The output time signal of a basic unit 2n of the final stage is input to a flip-flop 4. The flip-flop 4 obtains a first output time signal Ta [n] and sets as an output signal y, at a timing at which a second output time signal Tb [n] transitions. The output signal y is a digital value of 1 or 0. Subsequently, a specific operation in the arithmetic apparatus of the present embodiment will be described. Here, as the specific arithmetic operation, a case where each of data is one bit in $y=\sigma(\Sigma w_i x_i)$ will be described.

$$w_i \in \{-1, +1\} \quad (2)$$
$$x_i \in \{-1, +1\}$$
$$\sigma(x) = \begin{cases} -1, & x < 0 \\ +1, & x \geq 0 \end{cases}$$

That is, the wi and xi are values of −1 or +1. In addition, σ (x) becomes −1 when x is smaller than 0, and σ (x) becomes +1 when x is equal to or greater than 0. Since the wi is specifically expressed as the delay time, it is possible to be processed as a value other than −1 or +1, and it is also possible to process information of a lot of bits.

The first and second input time signals Ta [i−1] and Tb [i−1] are input to the basic unit 2i. Specifically, a first input time signal Ta [i−1] is input to the first signal line of the delay circuit, and the second input time signal Tb [i−1] is input to the second signal line. Since there is the variable resistance element corresponding to the weights wi on the first signal line, the first input time signal Ta [i−1] becomes Ta [i−1]+wi such that the first input time signal Ta [i−1]+wi is output to the first input signal line of the switching circuit 2i2. A second input time signal Tb [i−1] is output to the second input signal line, without causing the delay. A time signal τ [i] is defined as τ [i]=Tb [i]−Ta [i].

The switching circuit 2i2 switches output destinations of time signals Ta [i] and Tb [i], based on the input data xi. This means that an arithmetic operation corresponding to an input time signal τ [i]×xi is performed with respect to the input time signal τ [i]. When the xi is +1, the nMOS transistors QA21 and QA24 are turned on, and the pMOS transistors QA22 and QA23 are turned off. As a result, the first input signal line is connected to the first output signal line, and the second input signal line is connected to the second output signal line. This means that an arithmetic operation corresponding to the input time signal τ [i]×(+1) is performed with respect to the input time signal τ [i]. Meanwhile, when the xi is −1, the nMOS transistors QA21 and QA24 are turned off, and the pMOS transistors QA22 and QA23 are turned on. As a result, the first input signal line is connected to the second output signal line, and the second input signal line is connected to the first output signal line. This means that an arithmetic operation corresponding to the input time signal τ [i]×(−1) is performed with respect to the input time signal τ [i].

That is, in the basic unit, an arithmetic operation illustrated in the following Equation (3) is performed.

$$\tau[i]=(\tau[i+1]+w_i)\times x_i \quad (3)$$

However, in the Equation (3), it does not mean that the same arithmetic operation as Σwixi is performed. In order to perform the arithmetic operation of Σwixi in the n basic units, conversion of input data is performed in the input circuit 5.

The conversion of the input data is performed by using the following Equation (4).

$$\tau_n = \sum_{i=1}^{n} w_i \left( \prod_{j=1}^{n} x'_j \right) = \sum_{i=1}^{n} w_i x_i \quad (4)$$

$$x'_i = \begin{cases} x_n & \text{if } i = n \\ XOR(x_i, x_{i+1}) & \text{else} \end{cases}$$

In such a manner, an arithmetic operation corresponding to Σwixi is performed in the n basic units.

Figure 6A:
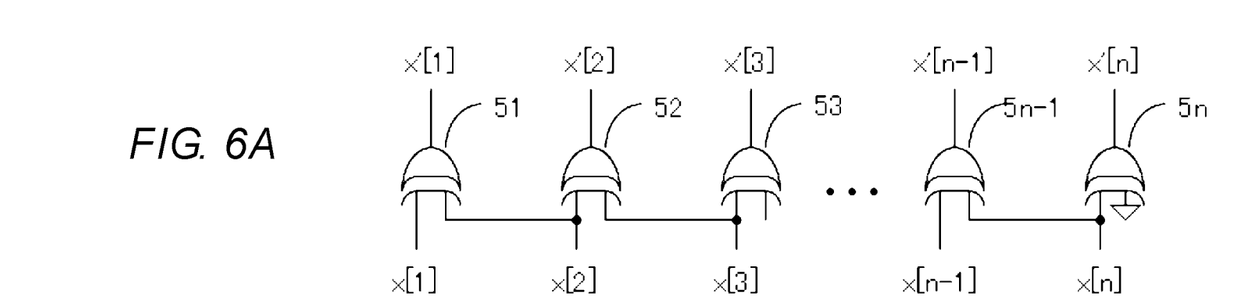
FIGS. 6A and 6B are circuit diagrams of an input circuit in the neural network.
Figure 6B:
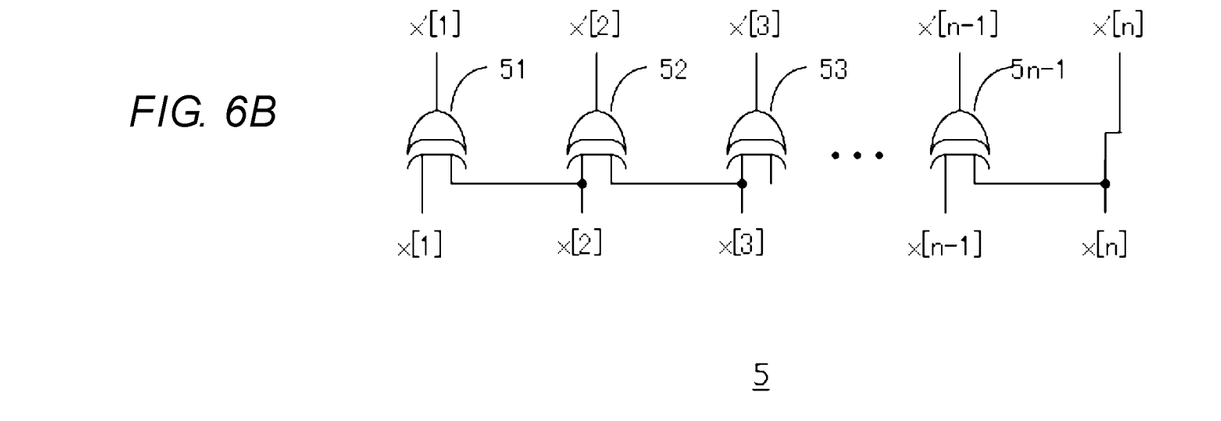

FIGS. 6A and 6B are circuit diagrams of the input circuit 5. The input circuit 5 converts the n-bit input data x [1: n] into n-bit input data x' [1:n]. The input circuit 5 in FIG. 6A includes n XOR circuits 51 to 5n. The XOR circuit 51 generates the input data x' [1] according to an XOR operation of the data x [1] and x [2]. That is, an i-th XOR circuit 5i generates the input data x' [i], and outputs the generated input data x' [i] to the switching circuit of the basic unit 2i according to the XOR operation of data x [i] and x [i+1]. An arithmetic operation of the data x [n] and 0 is performed in the XOR circuit 5n that generates x' [n] corresponding to the least significant bit. As illustrated in FIG. 6B, when 0 and x [n] are input to the XOR circuit, since an output x' [n] is equal to the x [n], the x [n] may be directly used as the x' [n], without using the XOR circuit 5n.

The first and second output time signals Ta [n] and Tb [n] output from the basic unit 2n of the final stage are input to the flip-flop circuit 4. At a timing at which the second output time signal Tb [n] transitions, the first output time signal Ta[n] is obtained. The obtained first output time signal Ta [n] is output as an output signal y.

Subsequently, a specific operation of the basic unit of the present embodiment will be described. FIGS. 7A and 7B and FIGS. 8A and 8B are timing diagrams for explaining examples of an operation of the basic unit. Waveforms of signals A1 and B1 input to a delay circuit 211, signals A2 and B2 input to a switching circuit 212, and signals A3 and B3 output from the switching circuit 212 are illustrated. A horizontal direction represents a time and a vertical direction represents a voltage value. Signals A1 and B1 transition at the same timing. Here, when wi=+1, a resistance value of the variable resistance element RA1 is set to be smaller than a resistance value of the resistance element RB1. In addition, when wi=−1, the resistance value of the variable resistance element RA1 is set to be greater than the resistance value of the resistance element RB1.

Figure 7A:
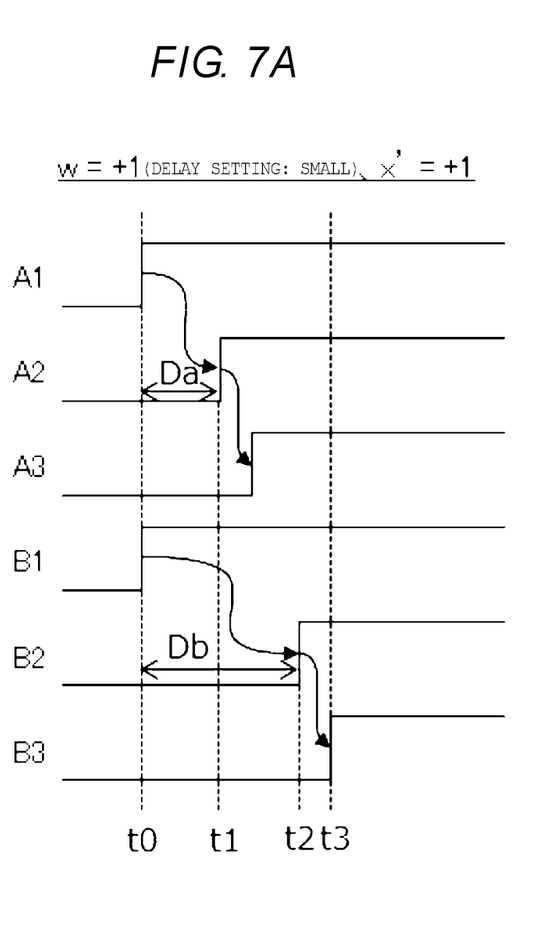
FIGS. 7A and 7B are timing charts of input and output signals during an operation of the basic unit.
Figure 7B:
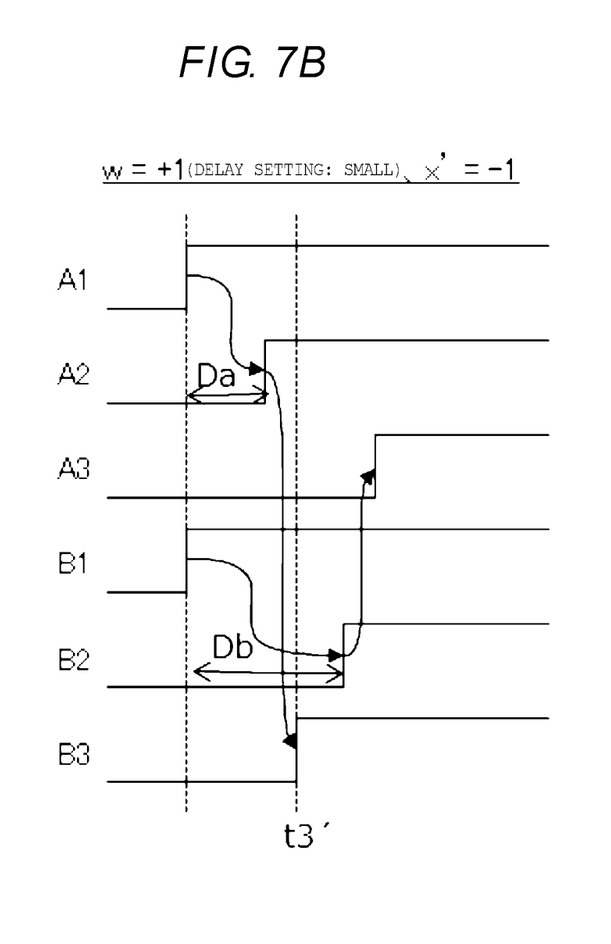

FIGS. 7A and 7B are examples where the weight wi is +1. The signal A2 transitions at a time t1 that comes after a time period Da passes from a time t0. The time period Da is a time period corresponding to the resistance value of the variable resistance element RA1 set according to the weight wi. That is, the signal A2 is a signal obtained by delaying the signal A1 by the time period Da. In addition, the signal B2 transitions at a time t2 that comes after a time period Db passes from the time t0. The time period Db is a time period corresponding to the resistance value (fixed value) of the resistance element RB1. That is, the signal B2 is a signal obtained by delaying the signal B1 by the time period Db. The signal A2 transitions faster than the signal B2.

FIG. 7A is an example where the input data xi=+1. In the switching circuit 2i2, a first input signal line is connected to the first output signal line, and the second input signal line is connected to the second output signal line. For that reason, the signal A2 is output as the signal A3, and the signal B2 is output as the signal B3.

FIG. 7B is an example where the input data xi=−1. In the switching circuit 212, the first input signal line is connected to the second output signal line, and the second input signal line is connected to the first output signal line. For that reason, the signal A2 is output as the signal B3, and the signal B2 is output as the signal A3.

The signals A3 and B3 are input from the basic unit 2n of the final stage to the flip-flop circuit 4. In FIG. 7A, a value 1 of the signal A3 is obtained at a time t3 at which the signal B3 transitions. Meanwhile, in FIG. 7B, at a time t3' at which the signal B3 transitions, a value 0 of the signal A3 is obtained.

Figure 8A:
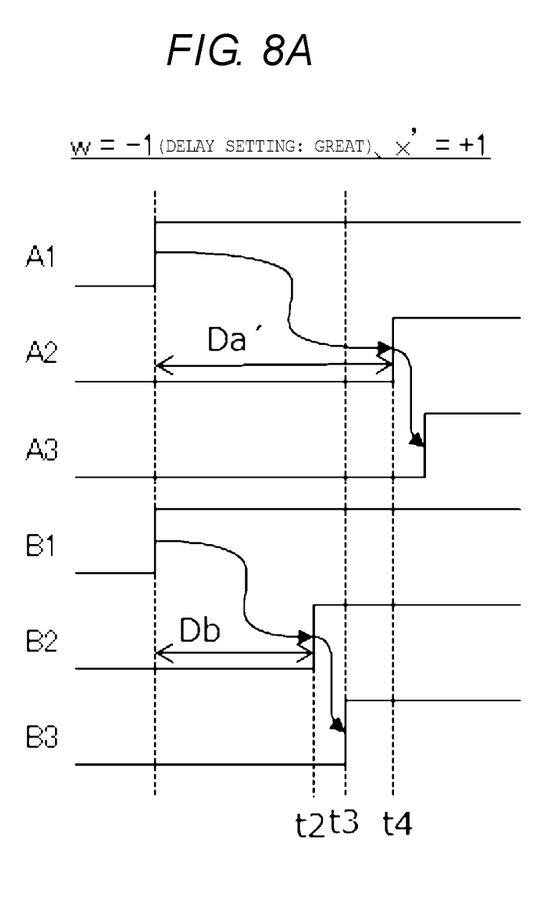
FIGS. 8A and 8B are timing charts of input and output signals during the operation of the basic unit.
Figure 8B:
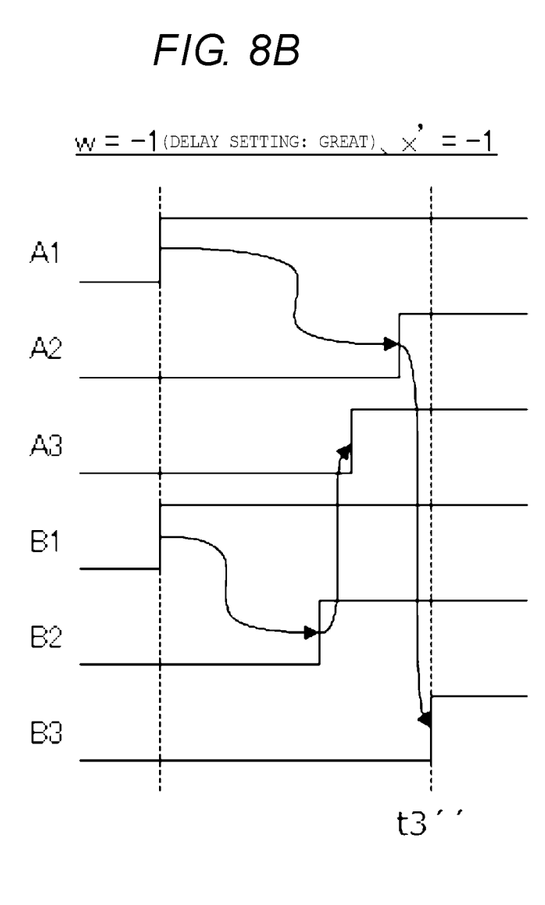

FIGS. 8A and 8B are examples where the weight wi is −1. The signal A2 transitions at a time t4 that comes after a time Da' passes from the time t0. In addition, the signal B2 transitions at the time t2 that comes after a time Db passes from the time t0. Since the resistance value of the variable resistance element RA1 is great, a delay time of the signal A2 is longer than a delay time of the signal B2. That is, the signal A2 transitions slower than the signal B2.

In FIG. 8A, the flip-flop circuit 4 obtains a value 0 of the signal A3 at a time t3 at which the signal B3 transitions. Meanwhile, in FIG. 8B, a value 1 of the signal A3 is obtained at a time t3" at which the signal B3 transitions.

By changing a weight, that is, a resistance value, it is possible to change a transition timing of the output signal line. That is, when (wi and xi)=(+1 and +1), the signal A3 transitions faster than the signal B3. Meanwhile, when (wi and xi)=(−1 and +1), the signal A3 transitions slower than the signal B3. In addition, when (wi and xi)=(+1 and −1), the signal A3 transitions slower than the signal B3. Meanwhile, when (wi and xi)=(−1 and −1), the signal A3 transitions faster than the signal B3.

As described above, the arithmetic apparatus according to the present embodiment performs an arithmetic operation using time difference between two time signals indicating information at a time at which a voltage value transitions. As a result, it is possible to configure the basic unit by the delay element using the variable resistance element, and a switching element. Therefore, it is possible to simplify a hardware configuration, and it is possible to reduce a circuit mount area. In addition, by using the variable resistance element, it is possible to appropriately set a time according to the weight.

In addition, the arithmetic apparatus according to the present embodiment performs a product sum operation with respect to the input data by repeating the delay and switching in a plurality of basic units. As a result, it is possible to realize a high speed and low power consumption in the arithmetic operation.

Figure 9:
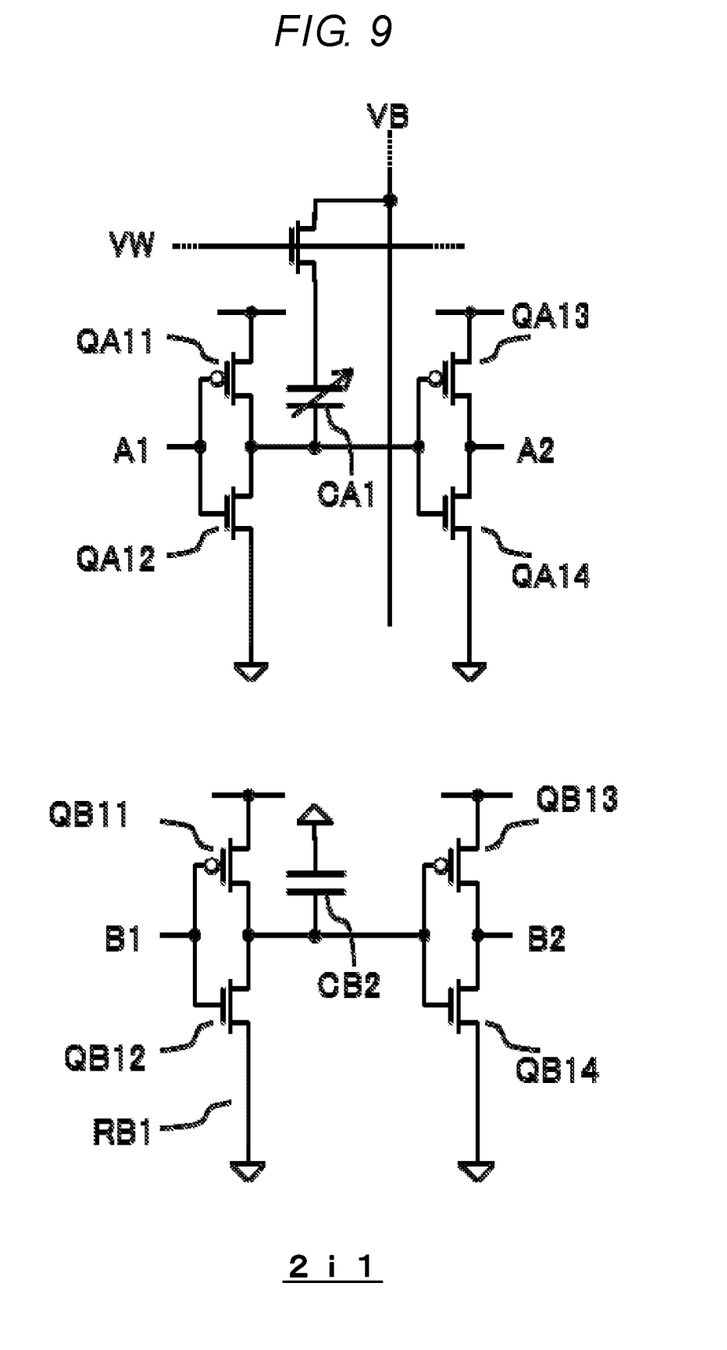
FIG. 9 is a circuit diagram of a delay circuit in the basic unit.

FIG. 9 is a circuit of another example of the delay circuit 2i1. Instead of a variable resistance element RA1 and a resistance element RB1, the delay circuit in FIG. 9 includes a variable capacitance element CA1 and a capacitance element CB1. A capacitance value of the variable capacitance element CA1 is set to delay a period of time corresponding to the weight wi. By using the variable capacitance element, it is possible to appropriately set a time according to the weight.

Figure 10:
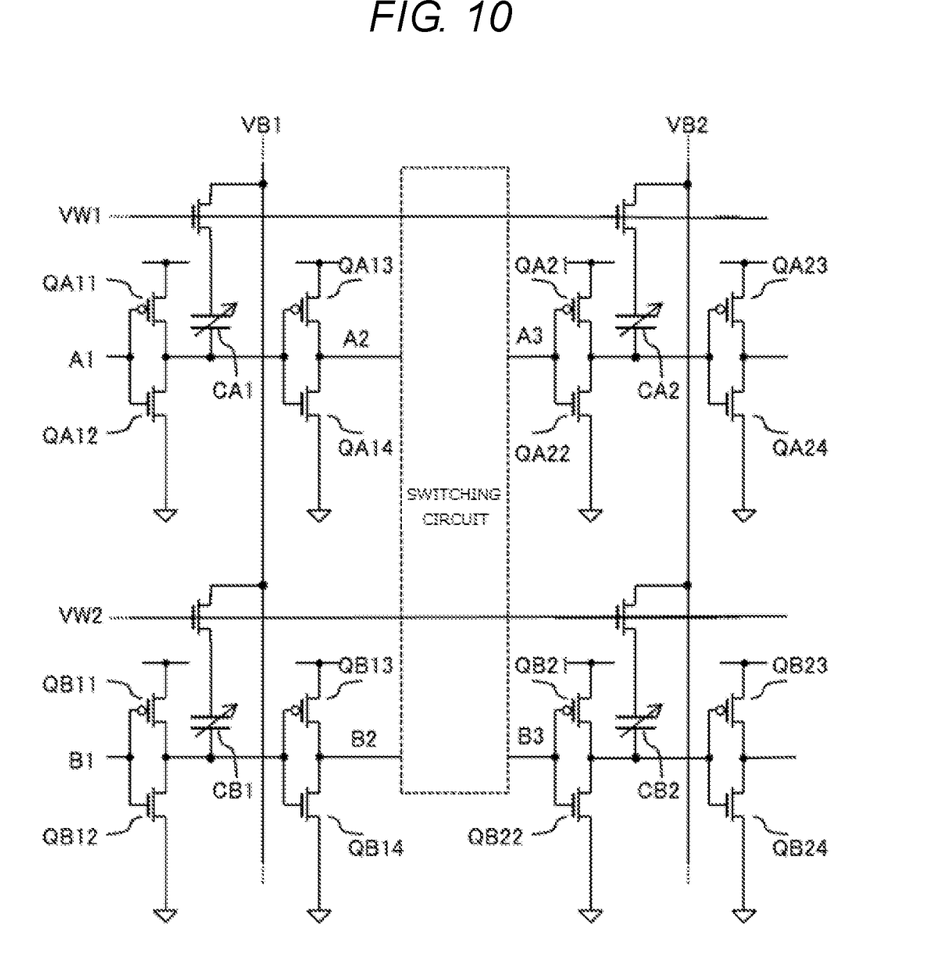
FIG. 10 is a circuit diagram of a delay circuit in the basic unit.
Figure 11:
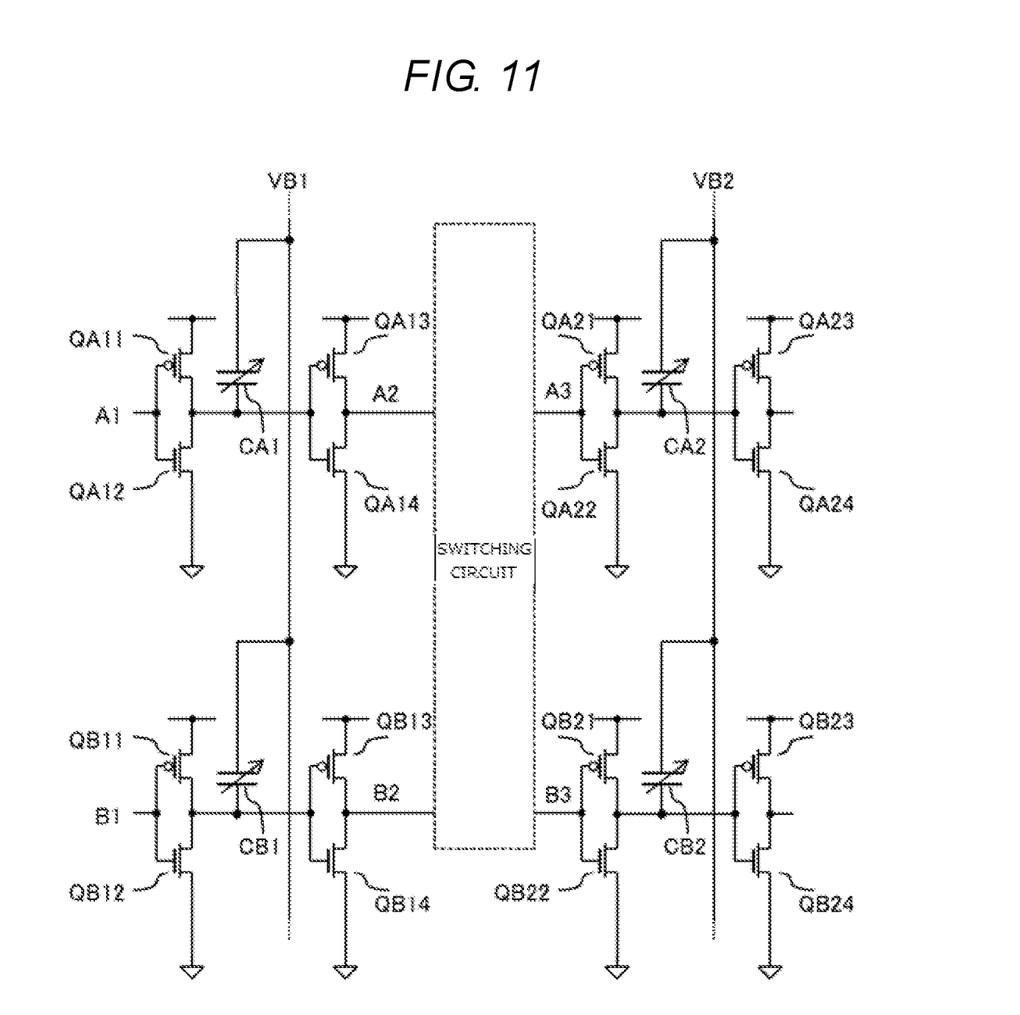
FIG. 11 is a circuit diagram of a delay circuit in the basic unit.

FIG. 10 and FIG. 11 are a circuit of other example of the delay circuit 2i1. The delay circuits are arranged in an array form. The capacitance element CB1 is variable. A line of the delay circuits selects by a word line VW or the input signal. Similarly, the delay circuit of FIG. 10 and FIG. 11 are possible to appropriately set a time according to the weight.

The basic unit may be without the switching circuit. The output signals of the delay circuit are input to the delay circuit of the latter stage regardless of the input data xi.

Modification Example

Figure 12:
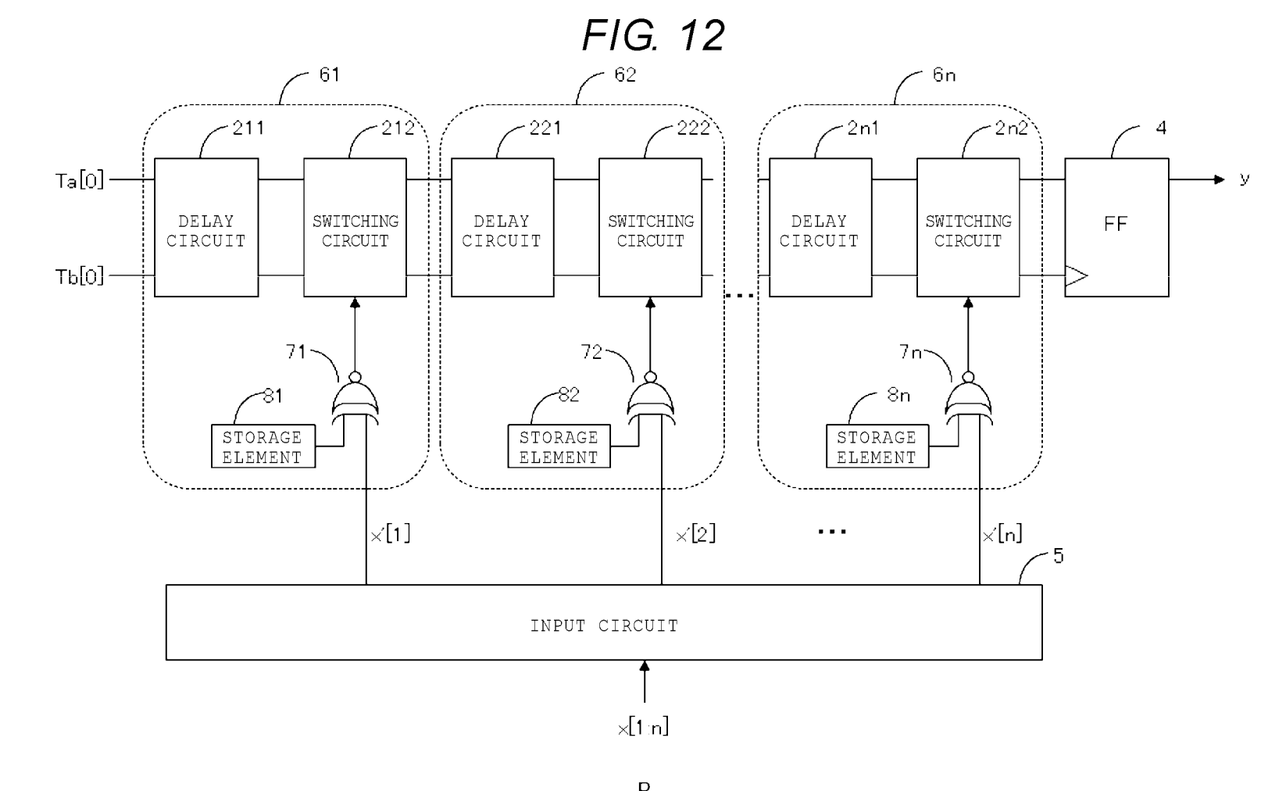
FIG. 12 is a block diagram of an arithmetic apparatus according to a modification example of the embodiment.

Next, a modification example of the arithmetic apparatus according to the first embodiment will be described. FIG. 12 is a block diagram of a modification example of the arithmetic apparatus P. The same reference numerals will be attached to the same components as the first embodiment, and a description thereof will be omitted. The arithmetic apparatus P in FIG. 12 includes n basic units 61 to 6n that are connected in a cascade manner and the flip-flop circuit 4.

Each configuration of the basic units 61 to 6n is the same as that in the first embodiment. Hereinafter, an i-th basic unit 6i will be described. The input data xi is input to a basic unit 6i (i is an arbitrary integer) to which a predetermined weight wi is set. In addition, the first and second input time signals Ta [i−1] and Tb [i−1] are input to the basic units 6i, and the basic units 6i generate the first and second output time signals Ta [i] and Tb [i].

The basic unit 6i includes a delay circuit 2i1, the switching circuit 2i2, an XNOR circuit 7i, and a storage element 8i. The delay circuit 2i1 delays any one or both of the first and second input time signals Ta [i−1] and Tb [i−1] as much as a time according to an abs (wi) of which time difference of the both is an absolute value of the weight wi. That is, the delay circuit 2i1 includes the variable resistance element for delaying the signals by a time corresponding to the abs (wi). The storage element 8i stores a sign (wi) that is a sign of the weight wi. The XNOR circuit 7i performs an XNOR operation of the data x [i] and the sign (wi), and outputs the performed arithmetic operation result to the switching circuit 2i2.

That is, the basic unit 6i computes (τ [i−1]+abs (wi))×sign (wi)×xi. The arithmetic apparatus in FIG. 12 can obtain the same result (y=σ (Σwixi)) as the arithmetic apparatus in FIG. 2.

In the arithmetic operation using the delay time, an error may occur in the arithmetic operation due to variations of the delay time from manufacture variations of elements. However, in the modification example of the embodiment, since a logical operation using a general-purpose digital circuit for a sign operation is performed, such error would not occur. For that reason, although the circuit mount area increases more than that of the first embodiment, it is possible to obtain a more accurate arithmetic operation result.

In addition, also in the modification example, it is possible to achieve a high speed and low power consumption, similarly to the first embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An arithmetic apparatus for a neural network comprising:
   a plurality of digital-time conversion circuits connected in series, each of the digital-time conversion circuits being configured to
   delay a first input time signal by a variable amount,
   delay a second input time signal by a fixed amount, and
   output the delayed first and second input time signals respectively as either first and second output time signals or second and first output time signals, in accordance with input data; and
   a time-digital conversion circuit connected to a last digital-time conversion circuit in the series, and configured to
   generate a digital output signal based on first and second output time signals from the last digital-time conversion circuit, wherein
   the time-digital conversion circuit outputs, as the digital output signal, the first output time signal from the last digital-time conversion circuit at a timing of transition of a value of the second output time signal from the last digital-time conversion circuit.

2. The arithmetic apparatus according to claim 1, wherein, in each of the digital-time conversion circuits,
   the input data is one-bit data, and
   when the input data is a first value, the delayed first input time signal is output as the first output time signal, and the delayed second input time signal is output as the second output time signal, and when the input data is not the first value, the delayed first input time signal is output as the second output time signal, and the delayed second input time signal is output as the first output time signal.

3. The arithmetic apparatus according to claim 2, wherein, in each of the digital-time conversion circuits,
the first output time signal of an immediately previous digital-time conversion circuit, if any, is input as the first input time signal, and
the second output time signal of the immediately previous digital-time conversion circuit, if any, is input as the second input time signal.

4. The arithmetic apparatus according to claim 1, wherein each of the digital-time conversion circuits includes a first input signal line through which the first input time signal is input, a second input signal line through which the second input time signal is input, a first output signal line through which the first output time signal is output, and a second output signal line through which the second output time signal is output.

5. The arithmetic apparatus according to claim 4, wherein, in each of the digital-time conversion circuits,
the input data is one-bit data, and
the digital-time conversion circuit includes a switching circuit configured to connect the first input signal line to the first output signal line and the second input signal line to the second output signal line, when the input data is a first value, and connect the first input signal line to the second output signal line and the second input signal line to the first output signal line, when the input data is not the first value.

6. The arithmetic apparatus according to claim 5, wherein each of the digital-time conversion circuits further includes a first delay circuit having a variable resistor and configured to delay the first input time signal by the variable amount, which corresponds to a resistance of the variable resistor, and a second delay circuit having a non-variable resistor and configured to delay the second input signal by the fixed amount, which corresponds to a resistance of the non-variable resistor.

7. The arithmetic apparatus according to claim 6, wherein, in each of the digital-time conversion circuits,
the switching circuit includes a first switching element of a first type connected between the first input signal line and the first output signal line, a second switching element of a second type connected between the first input signal line and a second output signal line, a third switching elements of the second type connected between the second input signal line and the first output signal line, and a fourth switching element of the first type connected between the second input signal line and the second output signal line.

8. The arithmetic apparatus according to claim 1, wherein the variable amount is set to be larger than or smaller than the fixed amount.

9. The arithmetic apparatus according to claim 1, wherein each of the digital-time conversion circuits further includes a storage element and an XNOR circuit configured to carry out an XNOR operation on a value of data stored in the storage element and a value of the input data, a result of the XNOR operation being input to the digital-time conversion circuit as the input data.

10. A neural network comprising an input layer, an output layer, and one or more hidden layers provided between the input layer and the output layer, said one or more hidden layers including a plurality of arithmetic apparatuses, each of the arithmetic apparatuses comprising:
a plurality of digital-time conversion circuits connected in series, each of the digital-time conversion circuits being configured to delay a first input time signal by a variable amount, delay a second input time signal by a fixed amount, and output the delayed first and second input time signals respectively as either first and second output time signals or second and first output time signals, in accordance with input data; and
a time-digital conversion circuit connected to a last digital-time conversion circuit in the series, and configured to generate a digital output signal based on first and second output time signals from the last digital-time conversion circuit, wherein
in each of the arithmetic apparatuses, the time-digital conversion circuit outputs, as the digital output signal, the first output time signal from the last digital-time conversion circuit at a timing of transition of a value of the second output time signal from the last digital-time conversion circuit.

11. The neural network according to claim 10, wherein, in each of the digital-time conversion circuits,
the input data is one-bit data, and
when the input data is a first value, the delayed first input time signal is output as the first output time signal, and the delayed second input time signal is output as the second output time signal, and
when the input data is not the first value, the delayed first input time signal is output as the second output time signal, and the delayed second input time signal is output as the first output time signal.

12. The neural network according to claim 11, wherein, in each of the digital-time conversion circuits of each of the arithmetic apparatuses,
the first output time signal of an immediately previous digital-time conversion circuit, if any, is input as the first input time signal, and
the second output time signal of the immediately previous digital-time conversion circuit, if any, is input as the second input time signal.

13. The neural network according to claim 10, wherein, in each of the arithmetic apparatuses,
each of the digital-time conversion circuits includes a first input signal line through which the first input time signal is input, a second input signal line through which the second input time signal is input, a first output signal line through which the first output time signal is output, and a second output signal line through which the second output time signal is output.

14. The neural network according to claim 13, wherein, in each of the digital-time conversion circuits of each of the arithmetic apparatuses,
the input data is one-bit data, and
the digital-time conversion circuit includes a switching circuit configured to connect the first input signal line to the first output signal line and the second input signal line to the second output signal line, when the input data is a first value, and connect the first input signal line to the second output signal line and the second input signal line to the first output signal line, when the input data is not the first value.

15. The neural network according to claim 14, wherein, in each of the arithmetic apparatuses,
each of the digital-time conversion circuits further includes a first delay circuit having a variable resistor and configured to delay the first input time signal by the variable amount, which corresponds to a resistance of the variable resistor, and a second delay circuit having a non-variable resistor and configured to delay the second input signal by the fixed amount, which corresponds to a resistance of the non-variable resistor.

16. The neural network according to claim 15, wherein, in each of the digital-time conversion circuits of each of the arithmetic apparatuses, the switching circuit includes a first switching element of a first type connected between the first input signal line and the first output signal line, a second switching element of a second type connected between the first input signal line and a second output signal line, a third switching elements of the second type connected between the second input signal line and the first output signal line, and a fourth switching element of the first type connected between the second input signal line and the second output signal line.

17. The neural network according to claim 10, wherein, in each of the arithmetic apparatuses, the variable amount is set to be larger than and smaller than the fixed amount.

18. The neural network according to claim 10, wherein, in each of the arithmetic apparatuses, each of the digital-time conversion circuits further includes a storage element and an XNOR circuit configured to carry out an XNOR calculation of a value of data stored in the storage element and a value of the input data, a result of the XNOR calculation is input to the digital-time conversion circuit as the input data.

* * * * *